United States Patent Office 3,057,914
Patented Oct. 9, 1962

3,057,914
PROCESS FOR THE PREPARATION OF ISOBUTYRATE ESTERS
Garry C. Kitchens and Thomas F. Wood, Wayne, N.J., assignors to The Givaudan Corporation, New York, N.Y., a corporation of New Jersey
No Drawing. Filed Oct. 31, 1960, Ser. No. 65,886
9 Claims. (Cl. 260—488)

This invention relates to a novel process for preparing isobutyrate esters.

The compounds which may be prepared in accordance with this invention may be represented by the formula:

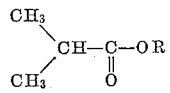

wherein R is a member selected from the group consisting of alkyl, aryl and aralkyl hydrocarbon groups, which may be saturated or unsaturated.

The indicated isobutyrates are known materials and are used as perfume ingredients, components of flavor essences, insect repellents, for special solvent applications and plasticizers for cellulose acetate.

Known methods for preparing the indicated isobutyrates are subject to certain disadvantages. These include the need to prepare either isobutyryl chloride or to carry out the direct esterification with isobutyric acid and strong inorganic acid catalyst or isobutyric anhydride. In the latter two methods it is necessary to remove water or large amounts of isobutyric acid, which is expensive and time consuming.

In accordance with this invention we have succeeded in providing a commercially practical method for preparing the indicated isobutyrates and at the same time overcoming the disadvantages of the known processes. Further, our process possesses unexpected advantages in that, from an economical point of view, our method will produce two moles of isobutyrate esters for each mole of reactant used; whereas only one mole of ester is produced for each mole of isobutyryl chloride, isobutyric or isobutyric anhydride used. Also, in our process only the small amount of alkaline catalyst used must be neutralized, which simplifies the isolation of the isobutyrate esters. The crude products obtained in accordance with this process contain less by-products resulting from side reaction and thus the crudes are more economical to refine. In general, our process, in accordance with this invention, comprises reacting either 2,2,4,4-tetramethyl-1,3-cyclobutanedione or a keto ester having the formula

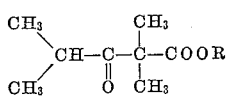

with an alcohol, ROH, the R's having the same significance as hereinbefore noted. In general, the reaction is conducted in the presence of a small amount of a strong alkaline catalyst, such as an alkali metal base or a metal alcoholate. If desired, the catalyst may be introduced all at once or in portions, e.g., one-fourth of the catalyst may be added at 1 hour intervals over a period of 3 hours.

It has also been found advantageous to include lower aliphatic alcohols having up to 4 carbon atoms when our process is employed with alcohols, ROH, having more than 8 carbon atoms or which are sterically-hindered tertiary alcohols. The lower alcohol is removed by distillation after the reaction is carried out. This is an application of the so-called transesterification technique.

The reactions employed in accordance with this invention are illustrated by the following equations:

(1) *Starting With the Indicated Cyclobutanedione*

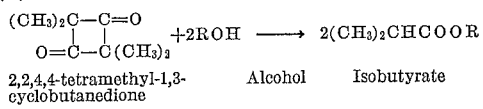

2,2,4,4-tetramethyl-1,3-    Alcohol    Isobutyrate
cyclobutanedione (2) *Starting With the Ketoesters*

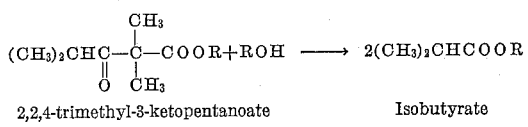

2,2,4-trimethyl-3-ketopentanoate      Isobutyrate (3) *Employing the Transesterification Technique*

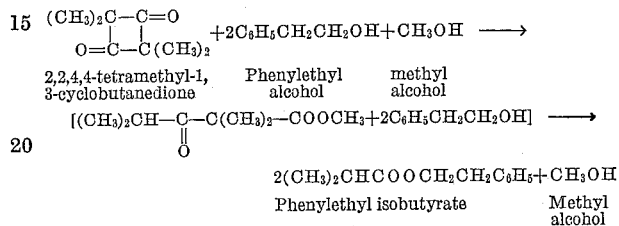

2,2,4,4-tetramethyl-1,    Phenylethyl    methyl
3-cyclobutanedione       alcohol      alcohol 2(CH₃)₂CHCOOCH₂CH₂C₆H₅+CH₃OH
Phenylethyl isobutyrate      Methyl alcohol The alcohols, ROH, which may be used in accordance with this invention, are those wherein R may be an alkyl, aryl or aralkyl hydrocarbon radical, which may be primary, secondary or tertiary. Examples of such alcohols are those wherein R is a saturated hydrocarbon group such as methyl (CH₃—), ethyl (CH₃—CH₂—), n-propyl (CH₃CH₂CH₂—)

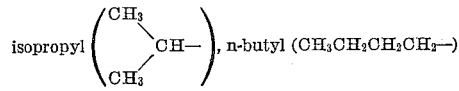, n-butyl (CH₃CH₂CH₂CH₂—)

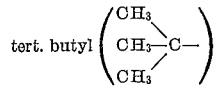

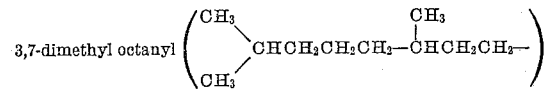

the hydrocarbon radicals from unsaturated primary alcohols such as

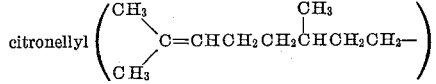

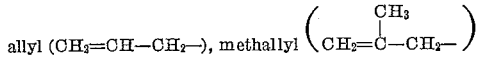

the hydrocarbon radicals from unsaturated tertiary alcohols such as

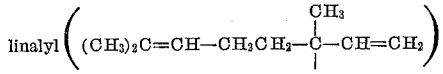

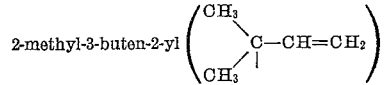

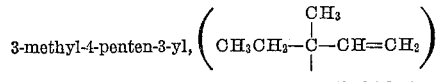

an unsaturated acetylenic group such as 2-methyl-3-butyn-2-yl

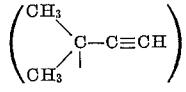

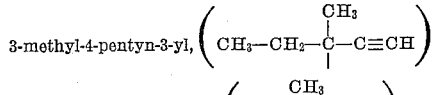

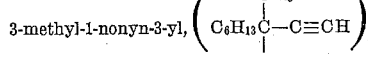

an aryl group such as phenyl or p-cresyl; a saturated aralkyl group such as benzyl or phenylethyl; and an unsaturated aralkyl group such as cinnamyl (—CH₂=CH₂—CH₂—)

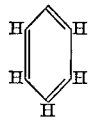

The catalysts employed in accordance with this invention are strong bases. Preferred among such catalysts are alkali metal bases and metal alcoholates, particularly the latter, as highest yields with minimum by-products are obtained when they are used. Specific examples of operable catalysts include sodium hydroxide, potassium hydroxide, sodium alcoholates and potassium alcoholates such as methylates, ethylates, propylates, butylates, linalylates, citronellylates, allylates, methallylates, phenylethylates, p-cresylates, benzylates and materials capable of producing these metal alcoholates from the corresponding alcohols such as sodium and potassium metals, sodium and potassium amides and hydrides.

In connection with the trans-esterification technique employed when high molecular weight alcohols or sterically-hindered alcohols are reacted, we have found that methyl alcohol, ethyl alcohol, normal or isopropyl alcohols, and n-, sec.-, or t-butyl alcohols may be used.

If desired, non-reactive solvents may be employed during the reaction. Diethyl ether and hydrocarbons, such as benzene or toluene, are satisfactory.

While anhydrous conditions are preferred, the reaction may be conducted in the presence of small amounts of water, if desired, with slightly decreasing yields.

The reaction can be carried out with or without agitation, the latter being preferred, and at atmospheric or superatmospheric pressures, the former being preferred.

The proportions of the materials employed in accordance with our process may be varied over wide limits.

When the reaction of an alcohol, ROH, and 2,2,4,4-tetramethyl-1,3-cyclobutanedione is conducted, it is desirable to use at least about 2 mols of the former per each mol of the latter. Advantageously, from about 2 to about 2.4 mols of the alcohol, on the same basis are used, in order to afford a stoichiometric excess of the alcohol, convert all of cyclobutanedione, and facilitate purification of the isobutyrate. There is no actual upper limit to the proportion of alcohol which may be used, practical and economic considerations being the only limiting factors.

When the reaction between the alcohol and the keto-ester is conducted, the proportions employed are at least a mol of the former per each mol of the latter. The preferred proportions are from about 1 to 1.2 mols of alcohol per mol of the keto-ester. As in the case of the reaction with the cyclobutanedione, practical and economic considerations are the sole limiting factors respecting the upper limit of the alcohol which may be used; and a stoichiometric excess of the alcohol is preferred for the same reasons aforementioned.

The proportion of catalyst employed may also vary within wide limits. Amounts as low as 0.5 percent by weight, based on the weight of the cyclobutanedione or keto ester employed, give satisfactory results. It is preferred to employ amounts from about 0.5 percent to about 2 percent, on the same basis, for advantageous results. Amounts of catalyst up to 5 percent on the same basis also give satisfactory results. While amounts greater than 5 percent may be used, if desired, their use is not recommended.

In those situations where the transesterification reaction is employed, as aforesaid, it has been found that about 1 to about 10 moles of the lower molecular weight alcohol, per mol of cyclobutanedione or keto-ester, may be used. From about 1 to about 5 mols, of the alcohol, on the same basis, give advantageous results.

In general, the temperatures under which the process of this reaction may be conducted vary over wide limits. While the reaction may be conducted at ambient room temperatures (about 25° C.), or even lower, it is preferred to operate at elevated temperatures. Temperatures from about 50° C. to reflux temperatures are satisfactory, refluxing conditions being preferred as the reaction proceeds more rapidly thereat than at lower temperatures. It will also be understood that as the molecular weight of the alcohol, ROH, increases, the temperature at which the reaction may be conducted increases. Also, it should be noted that the temperature at which the isobutyrate reaction is conducted in accordance with this invention is higher than the temperature at which the corresponding keto ester reaction is conducted, under otherwise corresponding conditions as to reactants, catalysts solvents, etc.

In view of the aforementioned wide range of alcohols, ROH, which may be used, it is apparent to those skilled in the art that the temperatures to be used will vary with the alcohols employed. For this reason too, it is not helpful to set forth any particular upper limit of the temperature range. A temperature as high as, say, 275° C., may not be attainable in making the methyl isobutyrate but it may be quite appropriate in making the isobutyrates of high molecular weight alcohols.

The time required to complete the reaction of this process will vary over wide limits, depending on the reactants, catalysts, proportions and temperature employed. Generally speaking, the time required is of the order of about ¼ to about 24 hours.

The keto-esters employed in accordance with our process include old as well as novel members. We prefer to use keto-esters made in accordance with the process disclosed and claimed in our co-pending application, Serial No. 65,937, filed concurrently herewith.

In general, subject to the hereinbefore and hereinafter mentioned distinctions, said process for preparing the ketoesters involves the use of 2,2,4,4-tetramethyl-1,3-cyclobutanedione, alcohol, ROH, and strong alkaline materials, and conditions substantially as employed in accordance with the present process. One exception is that in making keto esters, the amount of alcohol, ROH, is upwards from an equimolecular amount, compared with the cyclobutanedione.

The reaction for preparing the keto-esters may be represented as follows:

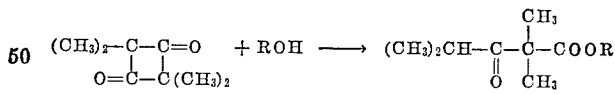

wherein R is an alkyl, aryl or aralkyl hydrocarbon radical, which may be saturated or unsaturated.

Also, contrary to the present process, when preparing the keto esters of higher molecular weight or sterically-hindered alcohols, the corresponding alkali metal alcoholate, in an amount at least up to stoichiometric amounts, may be used in place of the alcohol, and no additional catalyst (alkaline material) need be used.

The invention is further illustrated by the following examples, without, however, limiting the same to them.

EXAMPLE I

*Ethyl 2,2,4-Trimethyl-3-Ketopentanoate*

| | | |
|---|---|---|
| 2,2,4,4 - tetramethyl-1,3-cyclobutanedione | g | 200 |
| Ethyl alcohol | g | 800 |
| Triethylamine | g | 30 |
| H₂O | ml | 1 | were refluxed and agitated for 21 hrs. The excess alcohol was removed by atmospheric distillation recovering 780 g. of distillate consisting of alcohol, triethylamine, diisopropyl ketone and traces of 2,2,4,4-tetramethyl-1,3-cyclobutanedione. The residual liquid from the atmospheric distillation, 211 g., was vacuum distilled to yield as the main fraction 206.5 g., a colorless liquid, B.P. 62–67° C. (5 mm.), $n_D^{20}$ 1.4230, purity as ethyl 2,2,4-trimethyl-3-ketopentanoate (by saponification for 8 hrs.) 99.5%.

EXAMPLE II

Isopropyl 2,2,4-Trimethyl-3-Ketopentanoate

Into an agitated mixture of 35 g. of isopropyl alcohol, 0.5 g. solid sodium methylate and 10 ml. of benzene was added 70 g. of 2,2,4,4-tetramethyl-1,3-cyclobutanedione at 20° C. over a 15 minute period. The agitation was continued at 20–25° C. for 2 hrs. While 1.5 g. of sodium methylate, in three portions of 0.5 g. every ½ hr., were added.

The batch was neutralized by the addition of acetic acid and then 50 ml. of water added. The oil layer was separated and washed twice with 50 ml. of water. The benzene was removed under slightly reduced pressure. The residual liquid, 97 g., was vacuum distilled to yield as the main fraction 94 g., a colorless liquid, B.P. 68–69° C. (5 mm.), $n_D^{20}$ 1.4221, saponification value (24 hrs.) 269.3.

EXAMPLE III

Citronellyl 2,2,4-Trimethyl-3-Ketopentanoate

Into an agitated mixture of 70 g. 2,2,4,4-tetramethyl-1,3-cyclobutane-dione and 50 ml. of benzene was added a solution of 2 g. of solid sodium methylate in 78.1 g. of citronellol over a ½ hr. period at 40° C. The batch was agitated ½ hr. at 40° C. and ½ g. of solid sodium methylate added and agitated an additional ½ hr. at 35° C. The reaction mixture was acidified to phenolphthalein with acetic acid and 50 ml. of water added.

The oil layer was separated and washed twice using 50 ml. portions of water. The benzene was removed under slightly reduced pressure. The residual liquid, 149 g., was vacuum distilled and yielded as the main fraction 123 g. of the desired product, a colorless liquid, B.P. 115–118° C. (0.5 mm.), $n_D^{20}$ 1.4506, saponification value (24 hrs.) 194.2.

*Analysis.*—Calcd. for $C_{18}H_{32}O_3$: C, 72.93; H, 10.88. Found: C, 73.00; H, 10.75.

EXAMPLE IV

Phenylethyl 2,2,4-Trimethyl-3-Ketopentanoate

Into an agitated mixture containing 70 g. 2,2,4,4-tetramethyl-1,3-cyclobutanedione and 50 ml. of benzene was added a solution of 64 g. phenylethyl alcohol and 2.0 g. sodium methylate at 36° C. over a ½ hr. period. The batch was agitated 2 hrs. at 35° C. and neutralized to phenolphthalein with acetic acid. Fifty ml. of water was added and the oil layer separated and washed twice with 50 ml. water.

The benzene was removed by distillation under slightly reduced pressure. The residual oil, 132 g., was vacuum distilled to yield 39.5. g. of a fraction, B.P. 77–106° C. (0.5 mm.) consisting of a mixture of phenylethyl alcohol, and phenylethyl isobutyrate and phenylethyl 2,2,4-trimethyl-3-ketopentanoate as the main fraction, 88 g., B.P. 114–118° C. (0.5 mm.) $n_D^{20}$ 1.4886, saponification value (4 hrs.) 224.2 (24 hrs.) 232.9.

*Analysis.*—Calcd. for $C_{16}H_{22}O_3$: C, 73.25; H, 8.45. Found: C, 73.17; H, 8.26.

EXAMPLE V

4-Methylpentan-2-yl-2,2,4-Trimethyl-3-Ketopentanoate

Into an agitated mixture containing 70 g. 2,2,4,4-tetramethyl-1,3-cyclobutanedione and 50 ml of benzene was added a solution of 55 g. methyl isobutyl carbinol and 2.0 g. of solid sodium methylate over a ½ hr. period at 35° C. The batch was agitated ½ hr. with cooling. Then there was added 0.5 g. more of powdered sodium methylate catalyst and stirring continued for 1 hr. at 35°. Finally there was added portionwise an additional 0.5 g. of the catalyst, 0.25 g. immediately and the remainder after a 1 hour interval while stirring at 35° C. Stirring at 35° was continued for 1 hr. longer. In this manner the reaction was completed over a 4 hr. period, using altogether 3 g. sodium methylate catalyst.

The reaction mixture was neutralized with acetic acid using phenolphthalein indicator and 50 ml. of $H_2O$ was added. The oil layer was separated and washed twice with 50 ml. portions of water. The benzene was removed under slightly reduced pressure. The residual oil, 112 g., was vacuum distilled to yield as the main fraction, the desired ester, 92.5 g., B.P. 82–83° C. (0.5 mm.), $n_D^{20}$ 1.4299, saponification value (24 hrs.) 237.7.

*Analysis.*—Calcd. for $C_{14}H_{26}O_3$: C, 69.37; H, 10.82. Found: C, 69.20; H, 10.54.

EXAMPLE VI

2-Methyl-3-Buten-2-yl-2,2,4-Trimethyl-3-Ketopentanoate

Into a reaction flask equipped with an agitator, thermometer, solids-feeding funnel and a reflux type packed distillation column was charged 100 g. of 2-methyl-3-buten-2-ol. Solid sodium methylate (54 g.) was fed in over a 15 minute period keeping the temperature below 50° C. by cooling. Two hundred ml. of benzene was added and the reaction mixture was refluxed for 20 hrs. while removing 100 g. of distillate which boiled below 65° C. Towards the end of the reflux period the vapor temperature rose and approached 80° C.

The reaction mixture (sodium salt of 2-methyl-3-buten-2-ol) was cooled to 50° C. and 140 g. of 2,2,4-tetramethyl-1,3-cyclobutanedione was added over ½ hr. period with cooling. The batch was agitated 2 hrs. at 50° C. and cooled to 20° C. The batch was neutralized by adding with cooling approximately 60 g. of acetic acid. Three hundred ml. of water was slowly added and the benzene-oil layer separated.

The benzene oil-layer was washed neutral with water and the benzene was removed by distillation under slightly reduced pressure. The residual oil, 211 g., was vacuum distilled yielding 26 g., B.P. 20–62° C. (1 mm.), consisting of a mainly di-isopropyl ketone, 2-methyl-3-buten-2-yl isobutyrate and a trace of 2-methyl-3-buten-2-yl 2,2,4-trimethyl-3-ketopentanoate, a main fraction, 168 g., B.P. 62–68° C. (1 mm.), $n_D^{20}$ 1.4363, which was the desired product, 2-methyl-3-buten-2-yl-2,2,4-trimethyl-3-ketopentanoate.

EXAMPLE VII

Linalyl 2,2,4-Trimethyl-3-Ketopentanoate

Into the apparatus as described in Example VI was charged 200 g. of linalool and 200 ml. of benzene. Solid sodium methylate (54 g.) was fed in with agitation and cooling. The reaction mixture was agitated and refluxed for 22 hours while removing 90 g. of distillate boiling below 65° C. Towards the end of the reflux period the vapor temperature rose and approached 80° C.

The batch was cooled to 50° C. and 140 g. of 2,2,4-tetramethyl-1,3-cyclobutanedione was fed in at 50° C., with cooling over a ½ hr. period. The reaction mixture was agitated an additional 4 hrs. at 50° C. The batch was cooled to 25° C. and neutralized by slowly adding 60 g. of acetic acid with cooling. Two hundred ml. of water were added.

The benzene-oil layer was separated and washed neutral with water. The benzene was removed by distillation under slightly reduced pressure leaving a residual liquid of 314 g. The residual liquid was vacuum-distilled to yield 63 g. of fraction, B.P. 23–115° C. (0.5 mm.) consisting of linalool, linalyl isobutyrate, linalyl 2,2,4-trimethyl-3-ketopentanoate and traces of di-isopropyl ketone and a main fraction, 228 g., B.P. 115–119° C. (0.5 mm.) $n_D^{20}$ 1.4590, sp. gr. 25/25° C. 0.9339, saponification value 64.8 (4 hrs.), 194.9 (24 hrs.).

*Analysis.*—Calcd. for $C_{18}H_{30}O_3$: C, 73.42; H, 10.27. Found: C, 73.66; H, 9.86.

EXAMPLE VIII p-Cresyl 2,2,4-Trimethyl-3-Ketopentanoate

Into an agitated mixture containing 70 g. of 2,2,4,4-tetramethyl-1,3-cyclobutanedione and 50 ml. of benzene was added a solution of 2 g. sodium methylate and 55 g. para-cresol at 40° C. over a 20 minute period. The batch was agitated 2 hrs. at 40° C. and 0.5 g. sodium methylate added. The temperature was raised to 100° C. and agitated at 100° C. for 12 hrs. The reaction mixture was cooled to 20° C. and washed twice using 100 ml. portions of 5% sodium hydroxide solution. Acidification of the caustic wash gave 6 g. of unreacted p-cresol.

The oil layer was washed neutral with water and the benzene removed by distillation under slightly reduced pressure. The residual oil was vacuum distilled to yield 31 g., B.P. 42–108° C. (0.5 mm.), of fractions, containing di-isopropyl ketone and p-cresyl isobutyrate and p-cresyl 2,2,4-trimethyl-3-ketopentanoate as the main fraction, 82 g., B.P. 108–112° C. (0.5 mm.), $n_D^{20}$ 1.4897 saponification value (24 hrs.) 229.2.

*Analysis.*—Calcd. for $C_{15}H_{20}O_3$: C, 72.55; H, 8.11. Found: C, 72.49; H, 7.86.

EXAMPLE IX

Linalyl Isobutyrate

Into a distilling flask equipped with a reflux type, packed, distilling column was charged 154.2 g. of linalool, 100 g. of methanol, and 1 g. of solid sodium methylate. Seventy grams of 2,2,4,4-tetramethyl-1,3-cyclobutanedione was added over ½ hr. period keeping the temperature below 50° C. by cooling. The reaction mixture was refluxed 1 hr. and 75 g. of methanol removed by distillation. One hundred grams of toluene and 1 g. of solid sodium methylate added and the batch refluxed 2 hrs. while removing a methanol-toluene azeotrope (B.P. +63.8° C.). The reaction mixture was cooled and 0.5 g. of sodium methylate added and the refluxing and removal of the azeotrope was continued for 8 hrs. A total of 45 g. of distillate analyzing 44% methanol was removed.

The batch was neutralized with acetic acid, and 50 ml. of water added. The toluene-oil layer was washed twice with 50 ml. portions of water and toluene distilled off under slightly reduced pressure. The residual liquid was vacuum distilled yielding 77.5 g. of fractions, B.P. 38–62° C. (0.5 mm.), consisting of linalool, linalyl isobutyrate, traces of di-isopropyl ketone, methyl isobutyrate and methyl 2,2,4-trimethyl-3-ketopentanoate and 112.5 g. of linalyl isobutyrate (B.P. 62–66° C.) (0.5 mm.) purity (saponification) 99.6%, $n_D^{20}$ 1.4480.

EXAMPLE X

Phenylethyl Isobutyrate

Into a flask equipped with an agitator, a reflux type packed distilling column and a thermometer was charged 142 g. phenylethyl alcohol, 100 g. methanol and 2 g. solid sodium methylate. The solution was warmed to 40° C. and 70 g. 2,2,4,4-tetramethyl-1,3-cyclobutanedione was fed in with agitation and cooling at 40° C. over a ½ hr. period. The batch was refluxed ½ hr. and 96 g. methanol was then distilled off. One half gram powdered sodium methylate was added and the batch was heated at 130° C. for 5 hours. One half gram of sodium methylate and 50 ml. of toluene were added and the solution refluxed 3 hrs. while removing 10 g. of toluene-methanol azeotrope as distillate (B.P. 63.8° C.). The reaction mixture was cooled and neutralized with acetic acid. Fifty milliliters of water was added. The toluene-oil layer was separated and washed twice with 50 ml. portions of water. Toluene was removed under slightly reduced pressure. The residual liquid was vacuum distilled to yield 68 g. of a fraction (B.P. 58–70° C.) (0.5 mm.), consisting of 68% phenylethyl alcohol, and 32% phenylethyl isobutyrate, and 121 g. of phenylethyl isobutyrate (B.P. 70–71° C.) (0.5 mm.), $n_D^{20}$ 1.4869, purity 99.5%.

EXAMPLE XI

Phenylethyl Isobutyrate

Phenylethyl isobutyrate can easily be prepared in good yield from the keto ester, phenylethyl 2,2,4-trimethyl ketopentanoate, by using more phenylethyl alcohol (128 g.) and operating according to Example IV except an additional heating period of 5 hours at 130° C. is required after the 2 hr. treatment at 35° C.

Phenylethyl isobutyrate can be prepared from the keto ester, ethyl 2,2,4-trimethyl-3-ketopentanoate, as follows:

Into a distilling flask equipped with an agitator, a reflux-type packed distilling column and a thermometer was charged 93 g. ethyl 2,2,4-trimethyl-3-ketopentanoate (Example I), 122 g. phenylethyl alcohol, 100 ml. toluene and 2 g. of sodium methylate powder. The batch was refluxed (130–139° C.) for 4 hours while removing 31 g. of toluene-ethanol azeotrope as distillate.

The batch was neutralized with acetic acid, shaken with 50 ml. $H_2O$ and the resulting toluene-oil layer separated. The toluene-oil layer was washed with water and the toluene removed by distillation under slightly reduced pressure. The residual liquid was vacuum distilled to yield as the main fraction, 144 g. (purity 100.5%, $n_D^{20}$ 1.4872, sp. gr. 25/25° C. 0.9876) of phenylethyl isobutyrate.

While this invention has been described in detail it will be obvious to those skilled in the art, after understanding this invention, that various changes may be made therein without departing from the spirit or scope thereof. It is aimed, in the appended claims, to cover all such changes.

We claim:

1. The process for preparing esters having the formula:

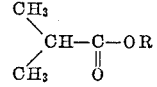

wherein R is a member selected from the group consisting of alkyl, mononuclear aryl and mononuclear aralkyl hydrocarbon groups, which comprises reacting about 1 mol of a first member selected from the group consisting of 2,2,4,4-tetramethyl-1,3-cyclobutanedione and a keto ester having the formula:

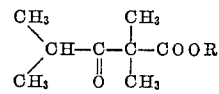

with at least about 2 mols of an alcohol of the formula, ROH, in those reactions employing 2,2,4,4-tetramethyl-1,3-cyclobutanedione and with an amount of at least about 1 mol of such alcohol in those reactions employing said keto ester, in the presence of a catalyzing amount of a strong alkaline material, selected from the group consisting of an alkali metal base and a metal alcoholate, at an elevated temperature under atmospheric pressure.

2. The process of claim 1, wherein the amount of the alkaline material is from about 0.5 percent to about 5.0 percent, by weight of said first member.

3. The process of claim 1, wherein said alcohol is selected from the group consisting of an alcohol having at least 8 carbon atoms and a sterically-hindered tertiary alcohol, which comprises conducting said reaction in the presence of from about 1 to about 10 mols of an aliphatic alcohol having up to 4 carbon atoms.

4. The process of claim 2, wherein 2,2,4-tetramethyl-1,3-cyclobutanedione is employed and the reaction is conducted at a temperature within the range from about 50° C. to atmospheric reflux temperatures.

5. The process of claim 2, wherein a keto ester is employed, and the reaction is conducted at a temperature within the range from about 50° C. to atmospheric reflux temperatures.

6. The process of claim 2, wherein a keto ester, from 1 to about 1.4 mols of the alcohol, and from about 0.5 to about 2.0 percent of said catalyst are employed, and the reaction is conducted under atmospheric reflux conditions.

7. The process for preparing linalyl isobutyrate, which comprises reacting, under reflux, about 1 mol of 2,2,4,4-tetramethyl-1,3-cyclobutanedione with about 2 mols of linalool, in the presence of about 3½ percent, by weight, based on the weight of said cyclobutanedione, of sodium methylate, and at least a stoichiometric amount of methanol.

8. The process for preparing phenylethyl isobutyrate, which comprises reacting, under reflux, about 1 mol of 2,2,4,4-tetramethyl-1,3-cyclobutanedione with about 2.2 mols of phenylethyl alcohol, in the presence of about 4 percent, by weight, based on the weight of said cyclobutanedione, of sodium methylate, and at least a stoichiometric amount of methyl alcohol.

9. The process for preparing phenylethyl isobutyrate, which comprises reacting, under reflux, about 1 mol of ethyl 2,2,4-trimethyl-3-ketopentanoate and about 2 mols of phenylethyl alcohol, in the presence of about 2 percent, by weight, based on the amount of said ketopentanoate, of sodium methylate.

No references cited.